US012653162B2

(12) United States Patent (10) Patent No.: US 12,653,162 B2
De Samber et al. (45) Date of Patent: Jun. 16, 2026

(54) LIGHTING SYSTEM FOR POULTRY

(71) Applicant: SIGNIFY HOLDING B.V., Eindhoven (NL)

(72) Inventors: Marc Andre De Samber, Lommel (BE); Aaron Benjamin Stephan, Chanhassen, MN (US); Harry Broers, 'S-Hertogenbosch (NL); Curtis Allen Leyk, Albany, MI (US); Dragan Sekulovski, Eindhoven (NL); Jack Tieberg, Plymouth, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/847,327

(22) PCT Filed: Mar. 10, 2023

(86) PCT No.: PCT/EP2023/056189

§ 371 (c)(1),
(2) Date: Sep. 16, 2024

(87) PCT Pub. No.: WO2023/180098

PCT Pub. Date: Sep. 28, 2023

(65) Prior Publication Data

US 2025/0194568 A1 Jun. 19, 2025

Related U.S. Application Data

(60) Provisional application No. 63/321,974, filed on Mar. 21, 2022.

(30) Foreign Application Priority Data

Mar. 31, 2022 (EP) ..................................... 22165997

(51) Int. Cl.
*A01K 31/18* (2006.01)
*A01K 1/00* (2006.01)
(Continued)

(52) U.S. Cl.
CPC ............ *A01K 31/18* (2013.01); *A01K 29/005* (2013.01); *F21V 21/15* (2013.01);
(Continued)

(58) Field of Classification Search
CPC ........ A01K 31/18; A01K 31/19; A01K 31/22; A01K 31/24; A01K 2227/30; A01K 15/02;
(Continued)

(56) References Cited

U.S. PATENT DOCUMENTS 11,439,126 B1 * 9/2022 Kraayenbrink ........ A01K 15/02
2010/0294205 A1 11/2010 Kakimi et al.
(Continued)

FOREIGN PATENT DOCUMENTS

CN 108071972 A 5/2018
CN 108271288 A 7/2018
(Continued)

*Primary Examiner* — Colin J Cattanach

(57) ABSTRACT

A lighting system (100) for controlling the movement of poultry (190). One or more properties of poultry (190) are obtained and used to define one or more characteristics of a light beam (115) or light beams (115) and thereby the light spot(s) (116) formed from the light beam(s) (115). The light beams (115) are configured to have a beam divergence of less than 15°.

20 Claims, 3 Drawing Sheets

(51) Int. Cl.

| | |
|---|---|
| *A01K 15/02* | (2006.01) |
| *A01K 29/00* | (2006.01) |
| *A01K 31/19* | (2006.01) |
| *A01K 31/22* | (2006.01) |
| *A01K 31/24* | (2006.01) |
| *A01K 39/01* | (2006.01) |
| *F21V 21/15* | (2006.01) |
| *F21V 23/04* | (2006.01) |
| *H05B 47/115* | (2020.01) |
| *H05B 47/16* | (2020.01) |

(52) U.S. Cl.
CPC ........ *F21V 23/0471* (2013.01); *H05B 47/115* (2020.01); *H05B 47/16* (2020.01); *A01K 1/0029* (2013.01); *A01K 15/02* (2013.01); *A01K 15/0201* (2025.08); *A01K 15/0203* (2025.08); *A01K 15/0207* (2025.08); *A01K 15/027* (2013.01); *A01K 15/0275* (2025.08); *A01K 31/19* (2013.01); *A01K 31/22* (2013.01); *A01K 31/24* (2013.01); *A01K 39/01* (2013.01); *A01K 2227/30* (2013.01)

(58) Field of Classification Search
CPC ............ A01K 15/0201; A01K 15/0203; A01K 15/0207; A01K 15/027; A01K 15/0275; A01K 1/0029; A01K 39/01
See application file for complete search history.

(56) References Cited

U.S. PATENT DOCUMENTS

| | | | |
|---|---|---|---|
| 2019/0174604 A1 | 6/2019 | Grajcar | |
| 2020/0037583 A1* | 2/2020 | Grajcar | .................. A01K 31/22 |
| 2021/0112647 A1* | 4/2021 | Coleman | ................ G01S 17/42 |
| 2023/0023110 A1* | 1/2023 | Suntych | ................ A61B 5/002 |
| 2023/0172167 A1* | 6/2023 | Eftelioglu | ........... A01K 29/005 |
| | | | 340/573.1 |

FOREIGN PATENT DOCUMENTS

| | | | |
|---|---|---|---|
| WO | 2016132415 A1 | 8/2016 | |
| WO | 2020165587 A1 | 8/2020 | |

* cited by examiner

LIGHTING SYSTEM FOR POULTRY

CROSS-REFERENCE TO PRIOR APPLICATIONS

This application is the U.S. National Phase application under 35 U.S.C. § 371 of International Application No. PCT/EP2023/056189, filed on Mar. 10, 2023, which claims the benefit of U.S. Provisional Patent Application No. 63/321,974, filed on Mar. 21, 2022 and European Patent application Ser. No. 22165997.2, filed on Mar. 31, 2022. These applications are hereby incorporated by reference herein.

FIELD OF THE INVENTION

The present invention relates to the field of poultry farming, and in particular to systems for use in poultry farming.

BACKGROUND OF THE INVENTION

With an ever-growing population, there is an increasing interest in industrial farms which are used to rear and raise poultry, such as chickens, ducks or turkeys. Typically, poultry are housed and fed in poultry coops or stables.

There is a desire to improve the health and welfare of poultry, which has been shown to have a positive outcome on commodities produced or resulting from raising the poultry (e.g., eggs, feathers and/or meat). One known mechanism for improving the welfare of poultry such as chickens is to encourage movement or exercise for the poultry.

Further and improved approaches for increasing the health and welfare of poultry are desired.

SUMMARY OF THE INVENTION

The invention is defined by the claims.

According to examples in accordance with an aspect of the invention, there is provided a lighting system for poultry. Said poultry may be defined as a flock of poultry throughout the application, such as a flock of chicken for example.

The lighting system comprises: a light emitting arrangement configured to project one or more light beams, each light beam creating a light spot and having a beam divergence of less than 15°; a control system communicatively coupled to the light emitting arrangement and configured to control one or more characteristics of the one or more light beams, wherein the control system is configured to: obtain one or more properties of the poultry; and control the one or more characteristics of the one or more light beams responsive to the obtained one or more properties of the poultry.

Disclosed embodiments are based on the understanding that any light beam (which each create a respective high etendue light spot) projected into a coop housing poultry causes a response in poultry. In particular, poultry will move in response to a light spot or light beam. Surprisingly the use of light spot functionality does not only lead to increased movements of the birds, but also enhances feed intake and results in an increased feed-to-food conversion ratio. Hence one sees an important effect on both welfare (by enrichment) and productivity.

The present invention recognizes that properties of the poultry will indicate or affect the success of the light beam(s) in promoting movement or other beneficial outcomes in the poultry. For instance, a measured movement of the poultry will indicate a level of success of causing movement using the light beams. It is also recognized that different poultry animals will respond differently to different light beam characteristics (e.g., chickens may respond more to light beams of a certain color than ducks).

Thus, modifying the characteristics of the one or more light beams responsive to one or more obtained properties of the lights beams allows a level of control over the response of the poultry to the light beams. This capability can be exploited to create movement in the poultry, to achieve improved welfare outcomes for the poultry.

The one or more light beams may, for instance, comprise one or more laser beams. However, other approaches for generated a directed or collimated light beam will be apparent to the skilled person (e.g., using appropriate lenses and/or light shielding/mirroring arrangements). Hence, said light beam creating a light spot and having a beam divergence of less than 15° may be phrased as a laser beam creating a laser spot.

Each light beam may have a beam convergence of less than 5°, e.g., be a collimated beam of light. In some examples, the light emitting arrangement may comprise one or more lasers for generating a laser beam of light, which is a highly collimated beam of light.

The one or more characteristics of the one or more light beams may include a speed of movement or a pulse speed of the one or more light beams. It has been identified that a speed of movement or pulsing speed of the light beams has an impact on poultry movement. For instance, changing a speed of movement of a light beam piques an instinctual interest in the light beam by the poultry. Changing a pulse speed similarly changes a level of interest of the poultry in the light beam (e.g., a quicker pulse may be more interesting, incurring greater movement or response speed).

The one or more characteristics of the one or more light beams may include a number, a color, a color temperature, a size, an intensity and/or a shape of the one or more light beams or any light spot created from the one or more light beams. It has been similarly identified that these characteristics of light beam(s)/spot(s) has an impact or effect on the movement of the poultry. Said movement may alternatively be the locomotion of the poultry.

The one or more light beams may comprise a plurality of light beams that create a plurality of light spots. Experimental evidence has shown that poultry physically respond (i.e., move more) responsive to more than one light spot compared to a single light spot. In particular, chicken is more likely to move between different spots, extending their range of movement.

The control system may be configured to controllably switch the one or more characteristics between at least: a first set of one or more characteristics; and a second set of one or more characteristics.

The control system may switch between the first and second set of one or more characteristics responsive to a schedule. Switching characteristics responsive to a schedule can overcome a habituation effect in poultry, e.g., to avoid the poultry becoming accustomed or used to the light beam(s)/spot(s). This approach can thereby maintain a high level of movement in the poultry.

In some examples, the control system switches between the first and second set of one or more characteristics responsive to the obtained one or more properties of the poultry.

The one or more properties may include at least one property responsive to a movement of the poultry. In this way, the lighting system may effectively make use of a feedback loop, for controlling movement of poultry (via the light beam(s)/spot(s)) responsive to a measured or monitored movement of the poultry. In this way, the effectiveness of the current characteristic(s) of the light beam(s)/spot(s) can be assessed, and used to decide whether and/or how to modify any characteristics of the light beam(s)/spot(s).

The one or more properties may include: a speed of movement of the poultry, an amount of wing flapping performed by the poultry, a number of poultry moving, a response time of poultry to a trigger, a locomotion, and/or a trajectory length of a movement by the poultry. These properties provide valuable information that indicate an amount of movement of the poultry, which can be assessed to accurately determine whether and/or how to modify the light beam(s) and/or light spot(s). Said poultry may alternatively be defined as the flock of poultry. Said one or more properties may be defined as one or more average properties of said poultry or said flock of poultry.

The control system may be configured to modify the one or more characteristics of the light beams responsive to at least one value of the one or more properties reaching or breaching a respective predetermined threshold. In this way, an observed lowering of the effectiveness of the light beam(s)/spot(s), i.e., a reduced movement, can be identified and addressed by modifying the characteristic(s) of the light beams. This provides a simple mechanism for defining a feedback mechanism for use with the lighting system.

The lighting system may further comprise a poultry movement sensor configured to monitor the at least one property responsive to a movement of the poultry. The poultry movement sensor may comprise any sensor that produces a signal responsive to a movement of the poultry. Examples include a camera, a microphone, time-of-flight proximity sensor, a movement sensor (e.g., a PIR sensor) and so on.

The light emitting arrangement may be configured to move the one or more light beams according to a pseudo-random pattern. It has been experimentally identified that moving the light beams in a pseudorandom pattern maintains an interest of the poultry, promoting and maintaining an interest of the poultry.

In aspects, said pseudorandom pattern may comprise a first average velocity, wherein the control system may be configured to change the first average velocity to a second average velocity responsive to the obtained one or more properties of the poultry.

The one or more properties of the poultry may include: a type of the poultry, a breed of the poultry, a scientific classification of the poultry, a life stage of the poultry and/or an age of the poultry. The one or more properties of the poultry may further include: a locomotion level of the poultry.

Poultry will have a different locomotion patterns and capability depending upon their age. For instance, chicks are very fast moving over short distances, while mature birds are slow and have lowered response times. Also, depending on age, different movements and activation are preferred (e.g., too sudden, abrupt and impactful movement behavior such as a wing flapping is not recommended for mature birds).

Embodiments exploit this recognition to control the movement of the poultry (via their light beam(s)) based on the age of the poultry, so that their (predicted and/or actual) movement can meet a desired or preferred movement for the life stage or age of the bird.

In the context of the present disclosure, a life stage may effectively represent a stage or development period (e.g., chick, fledgling, adolescent, mature adult etc.) of the poultry.

The light emitting arrangement may comprise a plurality of light emitting elements, each configured to emit one or more light beams.

The control system may comprise a user input device, wherein the user input device is configured to receive or retrieve the one or more properties of the poultry. Said user input device may for example be a user interface for receiving a user input indicative of the one or more properties of the poultry, wherein the control system may receive said user input and determine the one or more properties of the poultry based on said user input, thereby obtaining the one or more properties. The user interface may for example be a touchscreen display. The user input device may alternatively be a radiofrequency antenna for receiving an input signal indicative of the one or more properties of the poultry, wherein the control system may receive said user input signal and determine the one or more properties of the poultry based on said user input signal, thereby obtaining the one or more properties. Said user input signal may for example be provided/sent by a portable user device, or smartphone, or user computer device, or a poultry coop maintenance system, etc.

There is also proposed a poultry coop comprising any herein described lighting system; and a poultry enclosure configured to enclose poultry, wherein the one or more light beams projected by the light emitting arrangement of the lighting system create one or more light spots within the poultry enclosure.

There is also proposed a luminaire comprising any herein described lighting system and an ambient lighting unit for illuminating a poultry coop with ambient lighting. Said ambient lighting may be diffuse lighting. Hence, the luminaire may provide both ambient lighting and said one or more light beams, for example the luminaire providing a growing light to the poultry, while the luminaire is also providing said one or more light beams for enrichment of the poultry such as inducing additional movement and fitness to the chicken. In further embodiments, the ambient lighting may comprise a lighting characteristic different from the characteristics of the light beams according to the invention.

These and other aspects of the invention will be apparent from and elucidated with reference to the embodiment(s) described hereinafter.

In further aspects, the invention may provide a luminaire for controlling the movement of poultry, the luminaire comprising a lighting unit configured to project a pattern of laser spots, wherein each spot of the pattern of laser spots is pseudo-randomly moving with a first velocity and is having a first lighting characteristic; wherein the lighting unit is configured, in operation, to change the first velocity into a second velocity and/or to change the first lighting characteristic into a second lighting characteristic; wherein the first velocity is different from the second velocity, wherein the first lighting characteristic is different from the second lighting characteristic. Since the lighting unit is configured to control such a change in velocity and/or lighting characteristic of each spot of the pattern of laser spots, the luminaire may advantageously control, or be tailored for, different poultry and/or different properties of said poultry. Said respective velocity may be an average velocity of the pseudo-random moving laser spot. Said lighting characteristic may be light color, wavelength, light intensity, polarization. For example, the first lighting characteristic may be red light, whereas the second lighting characteristic may be an ultraviolet light. Such an example may allow the ultraviolet laser spots to be visible during a dark period in which the poultry is reared, while the red laser spots may be visible during a light period in which the poultry is reared. In embodiments, the lighting unit may be configured, in operation, to change the first velocity into a second velocity and/or to change the first lighting characteristic into a second lighting characteristic based on a predefined schedule. For example, said schedule may be a grow schedule, for example said grow schedule comprising predefined periods of light and periods of dark. Said luminaire may further comprise an ambient lighting unit for illuminating the poultry with ambient lighting. Said ambient lighting unit and corresponding illumination may follow said predefined schedule, i.e. said grow schedule. Yet in further embodiments, the luminaire may comprise a detector for detecting a property of the poultry; wherein the lighting unit is configured, in operation, to change the first velocity into a second velocity and/or to change the first lighting characteristic into a second lighting characteristic based on the detected property. Said detected property may for example be at least one of: a locomotion of the poultry, a speed of movement of the poultry, an amount of wing flapping performed by the poultry, a number of poultry moving, a response time of poultry to a trigger, a trajectory length of a movement by the poultry, an age of the poultry, a type of the poultry, a growth stage of the poultry. The embodiments and advantages according to the lighting system according to the invention may mutatis mutandis apply to said luminaire according to the further aspect of the invention.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
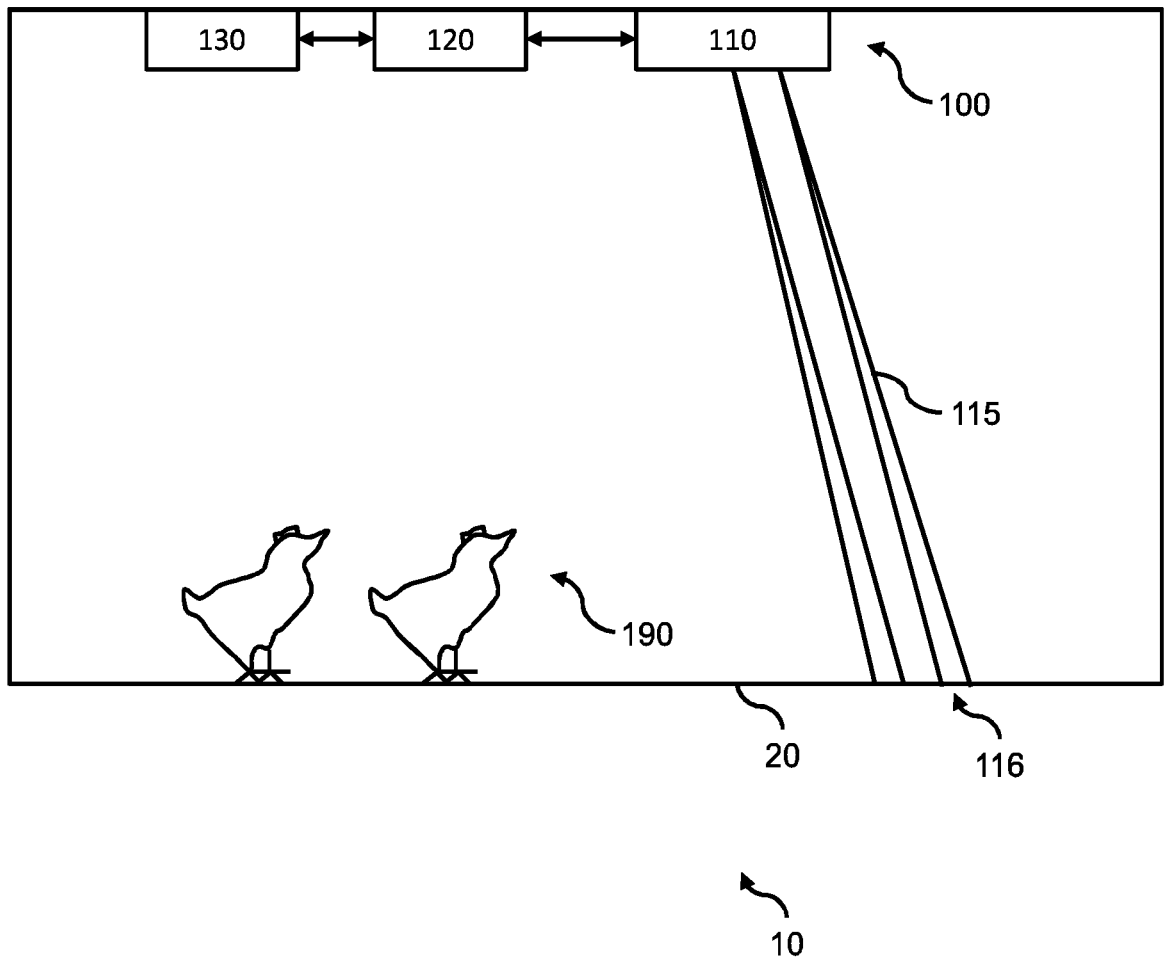
FIG. 1 illustrates a poultry coop and lighting system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for controlling the movement of poultry. One or more properties of poultry are obtained and used to define one or more characteristics of a light beam or light beam and thereby the light spot(s) formed from the light beam(s). The light beams are configured to have a beam divergence of less than 15°.

Embodiments are based on the realization that poultry respond to light beams or light spots, and that the properties of the poultry indicate a current response of the poultry to the light beam(s)/spot(s) and/or an expected response of the poultry to the characteristics of the light beam(s)/spot(s). By modifying or defining the characteristics based on the property or properties of the poultry, the light beam(s)/spot(s) can be refined to the particular poultry to perform improved movement control of the poultry.

It has also been recognized that beams of a narrow beam divergence have the greatest impact on the movement of poultry, and this recognition is exploited to encourage movement of the poultry. Improved light beam/spot characteristics (being those that encourage greater movement of the poultry) have also been surprisingly identified as enhancing feed intake of the poultry and resulting in an increased feed-to-food conversion ratio Embodiments may be employed in any suitable poultry environment, such as a poultry coop or industrial farm.

FIG. 1 illustrates a lighting system 100 according to an embodiment. The lighting system 100 is designed for encouraging movement of poultry 190. The lighting system may be formed in a poultry coop 10, which is itself an embodiment of the invention.

The poultry coop 10 comprises the lighting system 100 and a poultry enclosure 20 configured to enclose poultry. The lighting system 100 comprises a light emitting arrangement 110 and a control system 120.

The light emitting arrangement 110 is configured to project one or more light beams 115, e.g., a plurality of light beams. Each light beam 115 creates a light spot 116. The beam divergence of each light beam is less than 15°, e.g. less than 5°, e.g. less than 1°. This beam divergence can be achieved using one or more lasers to produce each light beam. Alternatively, this beam divergence can be achieved using a light source (e.g., an LED) and a collimator for collimating light emitted by the light source.

When the lighting system forms part of the poultry coop 10, wherein the one or more light beams projected by the light emitting arrangement of the lighting system create one or more light spots within the poultry enclosure 20.

It has been recognized that poultry 190 will respond to the presence of light spots created by a light beam of a light emitting arrangement with a narrow beam divergence. Without wishing to be bound by theory, poultry are believed to instinctively respond (in positive or negative modus) to events in the environment, particularly movement or changes in their environment. Light spots, produced using light beams of a narrow divergence, have been identified as triggering interest and movement in poultry, either for a kind of playing behavior or by mimicking the presence or movement of an insect (prey, hence food).

The control system is communicatively coupled to the light emitting arrangement and configured to control one or more characteristics of the one or more light beams. Various approaches for controlling characteristics of light beams would be apparent to the skilled person, e.g., by controlling electrical current flow to modules that affect the characteristics of the light beams.

The control system may be communicatively coupled by one or more wired channels or wireless channels (that employ a wireless communication protocol).

Suitable wireless communication protocols that may be used by the control system to communicate with the light emitting arrangement include an infrared link, Zigbee, Bluetooth, a wireless local area network protocol such as in accordance with the IEEE 802.11 standards, a 2G, 3G or 4G telecommunication protocol, and so on. Other formats will be readily apparent to the person skilled in the art.

More particularly, the control system 120 is configured to obtain one or more properties of the poultry; and control the one or more characteristics of the one or more light beams responsive to the obtained one or more properties of the poultry. In this way, one or more characteristics of the light beam(s) are specific to the property/properties of the poultry 190.

The control system 120 may also be configured to control the light emitting arrangement 110 to move the light beam(s)/spot(s), i.e., control a direction in which the light beam(s) is/are emitted. It is recognized that the use of dynamic light spot functionality does not only lead to larger (artificially induced, so controlled) movements of the birds, but also enhances better feed intake and results in an increased feed-to-food conversion ratio. Hence, there is improved welfare (by enrichment) and productivity.

Approaches for controlling the direction of a light beam are well established, and may comprise controlling an orientation of a surface on which a light emitting element (producing the light beam) lies, or controlling a direction in which a mirror (redirecting an emitted light beam) points.

Embodiments propose systems and approaches for modifying or controlling the light beam(s) based on one or more properties of the poultry. It is recognized that the effect of different types of light beam(s) on particular poultry are influenced by the characteristic(s) of the poultry.

The characteristics of the light beam(s) responsive to the one or more properties of the poultry are preferably characteristics that affect a dynamic change in the movement, size or shape of the light beam(s) and/or light spot(s). In particular, the one or more characteristics of the one or more light beams may include a speed of movement or a pulse speed of the one or more light beams. It is anticipated that these characteristics are particularly influential in affecting the movement behavior of the poultry.

As an example, it is expected that increased speed of movement of a light spot will result in increased movement of the poultry. Similarly, increased pulsing speed is anticipated to result in increased movement of the poultry.

In some examples, the one or more characteristics of the one or more light beams includes a number, a color, a color temperature, a size, an intensity and/or a shape of the one or more light beams or any light spot created from the one or more light beams. These characteristics have also been shown to have an influence on the movement of poultry.

For instance, for chickens, it is envisaged that yellow light spots will influence or promote movement to a greater extent than red spots. This is because a yellow spot may more closely resemble a prey of the chickens.

As another example, the shape of the light spot may influence a movement. For instance, for chickens, a light spot shaped like a bug encourages more movement than a light spot shaped like a circle.

As yet another example, an increased intensity of a light spot (e.g., increased apparent brightness) will be expected to increase a movement of the poultry by attracting greater attention).

Approaches for controlling such characteristics of a light beam or light spot are well established. For instance, a shape of a light spot may be modified by changing a focal length of a light beam and/or controlling which of a plurality of potential filters or lenses interact with the light beam (e.g., a filter with a cutout in the shape of a particular prey animal). As another example, a color or color temperature of a light spot may be modified by controlling which of a plurality of colored light sources are active and/or controlling which of a plurality of color filters interact with the light beam (e.g., to change or define the color of the light beam). An intensity of a light beam can be readily controlled by controlling the power available to be drawn by the light emitting arrangement.

The one or more characteristics of the one or more light beams and/or light spots may include a pattern of movement of the light beam(s) or light spot(s). Different movement patterns would trigger different levels of response in poultry. For instance, an erratically moving light spot will trigger greater movement in poultry compared to a more regularly or periodic movement pattern of the same light spot.

Various properties of the poultry may be used to define, set or control the one or more characteristic(s) of the light beams and/or light spots. A number of suitable examples will be described below.

In some examples, the light emitting arrangement may be configured to move the one or more light beams according to a random or pseudorandom pattern. Movement according to a random or pseudorandom pattern may be performed irrespective of any control of the characteristic(s) of the light beam(s)/spot(s) performed using hereafter described control methods. It has been recognized that movement of a light spot in a random or pseudorandom pattern is particularly effective at inducing movement in poultry, such that it would be beneficial to maintain such movement regardless of further control of the light beam(s)/spot(s).

Figure 2:
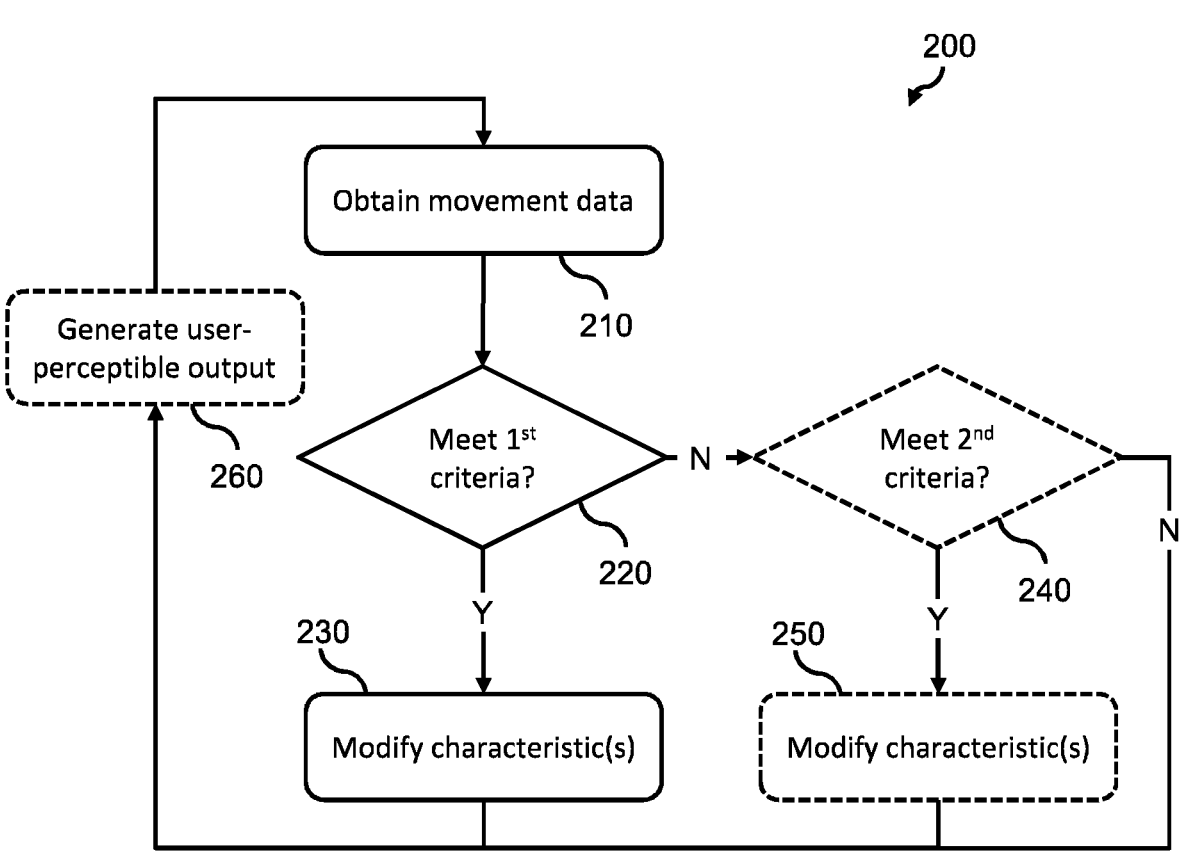
FIG. 2 illustrates a first control method.

FIG. 2 illustrates a first control method 200 or scheme for controlling one or more characteristics of the light beam(s) according to an embodiment. The control method may be employed by the control system 120 of FIG. 1.

The first control method monitors the poultry and uses feedback from the monitoring to control the characteristic(s) of the poultry. In particular, the first control method is configured to monitor a movement of the poultry, e.g., to determine or infer a level of response of the poultry to the light spot(s) provided to the poultry.

In this example, the one or more properties (used to control the characteristic(s) of the light beam(s) and/or light spot(s)) therefore include at least one property responsive to a movement of the poultry, i.e., movement data.

Referring back to FIG. 1, the lighting system 100 may further comprise a poultry movement sensor 130 configured to monitor the at least one property responsive to a movement of the poultry The first control method 200 comprises a step 210 of obtaining movement data of the poultry. The movement data changes responsive to a response level or movement of the poultry in response to the light spot(s) provided by the light emitting arrangement. The movement data may, for instance, comprise a numeric measure representing a level of movement of the poultry.

One approach for performing step 210 is to obtain video data of the poultry responding to the light spot(s). A computer vision process can process the video data to quantify the response of the birds to the light spot(s). One example approach is to use a video-processing method for real-time deduction of movement vectors from the video footage, which results in quantified data on the movement of the birds that are in a selected frame of the video data where the light spot(s) is/are present and during a specified light spot activation time slot. In this way, the movement of the poultry or each poultry can be quantified. In one example, the movement data comprises a measure of a total amount of movement of the poultry. In another example, the movement data comprises a measure of a number of poultry animals that move more than a predetermined amount (e.g., have a lateral movement of no less than 20 cm).

In another example, the computer-vision process may monitor an amount of wing flapping (e.g., number or size of wings flaps) performed by the poultry.

As yet another example, the computer-vision process may detect a response time of poultry to a trigger, such as a movement of the light beam(s)/spot(s). A slower response time may indicate that the poultry is less engaged with the light beam/spot, thereby indicating reduced movement.

Other approaches for determining movement data would be readily apparent to the skilled person. For instance, an intensity of an audio recording of the poultry may represent a movement of the poultry (with increased audio intensity indicating increased movement levels). An audio recording may also be used to monitor a response time of a poultry to a trigger. As another example, a positional sensor may track a movement of the poultry to generate the movement dat.

The first control method 200 can then move to a step 220 of determining whether the movement data meets one or more first predetermined criteria. The one or more first predetermined criteria may represent criteria that indicate that the poultry is not moving sufficiently to achieve a desired effect (e.g., movement is too low).

As one example, if the movement data comprises a measure of a total amount of movement of the poultry, the one or more first predetermined criteria may include a criterion that the value of the measure is below a first predetermined measure.

As another example, if the movement data comprises an amount of wing flapping, the one or more first predetermined criteria may include a criterion that the amount of wing flapping is below a first predetermined wing flapping amount.

Other suitable criteria will be apparent to the skilled person, and may depend upon further characteristics of the poultry (e.g., the age of the poultry, the type of poultry, the breed of poultry, the size of the poultry and so on).

If the movement data meets the one or more first predetermined criteria, then the first control method 200 may move to a step 230 of modifying the one or more characteristics of the light beam(s) and/or light spot(s) of the light emitting arrangement. In particular, the modification may be a modification that is expected or predicted to increase the movement of the poultry, e.g., increased movement speed or movement erraticism of the light spot(s).

In some examples, if the movement data does not meet the one or more predetermined criteria, then no modification is made to the characteristic(s) of the light beam(s)/spot(s), and the method reverts back to step 210.

In other examples, if the movement data does not meet the one or more predetermined criteria, then the method moves to an optional step 240 of determining whether the movement data meets one or more second predetermined criteria. The one or more second predetermined criteria may represent criteria that indicate that the poultry is moving too much. Too much movement in poultry can cause tendon or muscle damage (e.g., in larger birds or in very young birds).

As one example, if the movement data comprises a measure of a total amount of movement of the poultry, the one or more second predetermined criteria may include a criterion that the value of the measure is greater than a second predetermined measure.

As another example, if the movement data comprises an amount of wing flapping, the one or more second predetermined criteria may include a criterion that the amount of wing flapping is above a second predetermined wing flapping amount.

Other suitable criteria will be apparent to the skilled person, and may depend upon further characteristics of the poultry (e.g., the age of the poultry, the type of poultry, the breed of poultry, the size of the poultry and so on).

If the movement data meets the one or more second predetermined criteria, then the first control method 200 may move to a step 250 of modifying the one or more characteristics of the light beam(s) and/or light spot(s) of the light emitting arrangement. In particular, the modification may be a modification that is expected or predicted to decrease the movement of the poultry, e.g., decreased movement speed or movement erraticism of the light spot(s). Of course, step 250 is omitted is step 240 is not performed or present.

If the movement data does not meet the one or more second predetermined criteria, then no modification is made to the characteristic(s) of the light beam(s)/spot(s), and the method reverts back to step 210.

In some examples, the method comprises a step 260 of generating a user-perceptible output of the outcome of the activity analysis. Generating a user-perceptible output in the way may comprise generating an audio, visual or tactile output of the outcome of the determination process(s) 220 and 240 (if performed). Step 260 can be performed before repeating step 210.

The described control method 100 thereby provides an example of an approach in which control system is configured to modify the one or more characteristics of the light beams responsive to at least one value of the one or more properties reaching or breaching a respective predetermined threshold. Here, the predetermined threshold(s) represent the predetermined criterion/criteria.

It has been described how step 230 (and step 250 if performed) comprise modifying one or more characteristics of the light beam(s) and/or light spot(s) provided by the light emitting arrangement.

Modifying the characteristic(s) of a light beam/spot may comprise switching the one or more characteristics between at least a first set of one or more characteristics and a second set of one or more characteristics. In this way, the control method can switch between (at least) the first and second set of one or more characteristics responsive to the obtained one or more properties of the poultry.

Each set of one or more characteristics may effectively represent a "cue" for the poultry. Changing from one set of characteristics to another set of characteristics thereby effectively switches between two cues for the poultry.

This approach, of switching between sets of characteristics, can help reduce a habituation effect in the poultry to the characteristic(s) of the light beam(s)/spot(s), thereby improving an effectiveness of the proposed system.

Figure 3:
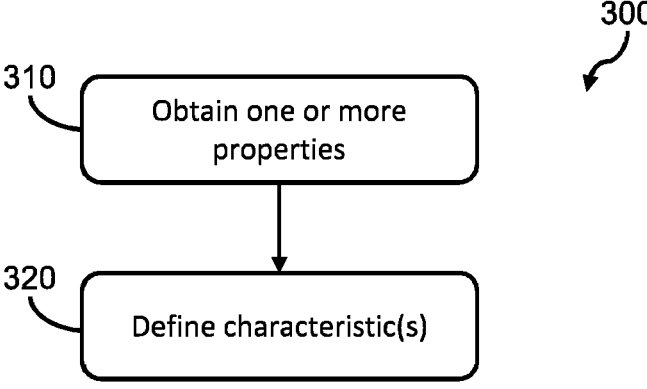
FIG. 3 illustrates a second control method.

FIG. 3 illustrates a second control method 300 for controlling one or more characteristics of the light beam(s) according to an embodiment. The control method may be employed by the control system 120 of FIG. 1.

The second control method comprises a step 310 of obtaining one or more identifying properties of the poultry. In particular, the identifying properties may characteristics responsive to an age, condition or type of the poultry. It has been recognized that the age, condition and type of poultry influence or affects the locomotion patterns and capability of the poultry.

For instance, chicks are very fast moving over short distances, while mature birds are slow and have lowered response times. Also, depending on age, different movements and activation are preferred. For instance, sudden, abrupt and impactful movement behavior such as a wing flapping is not recommended for mature birds.

As another example, different types of poultry (e.g., chicken versus turkey) will have different levels of desired movement and/or different responses to light beam(s) and/or light spot(s).

The identifying property(s) may be provided, for instance, at a user interface. As another example, the identifying property(s) may be provided from a memory or database containing identifying information of the poultry. As yet another example, the identifying may be provided from an imaging arrangement, e.g., configured to image the poultry and perform image-recognition on the poultry to determine identifying properties of the poultry.

Suitable examples of identifying properties include a type of the poultry, a breed of the poultry, a scientific classification of the poultry, a life stage of the poultry and/or an age of the poultry.

The second control method comprises a step 320 of controlling the characteristic(s) of the light beam(s) and/or light spot(s) responsive to such identifying properties of the poultry.

As an example, the size or shape of the light spot(s) may be controlled responsive to the type of poultry. Different types of poultry birds are anticipated to have a preference for different spot sizes or shapes (as their preferred mimicked prey type might differ). By controlling the light beam(s)/spot(s) based on the type of poultry, improved control over the movement of the poultry can be achieved.

As another example, the speed of movement for a light beam/spot may be responsive to an age of the poultry. Increased speed of movement is anticipated to cause increased movement in the poultry. The speed of movement may decrease with increasing age of the poultry, e.g., to prevent or restrict abrupt or sudden movement in mature birds.

Figure 4:
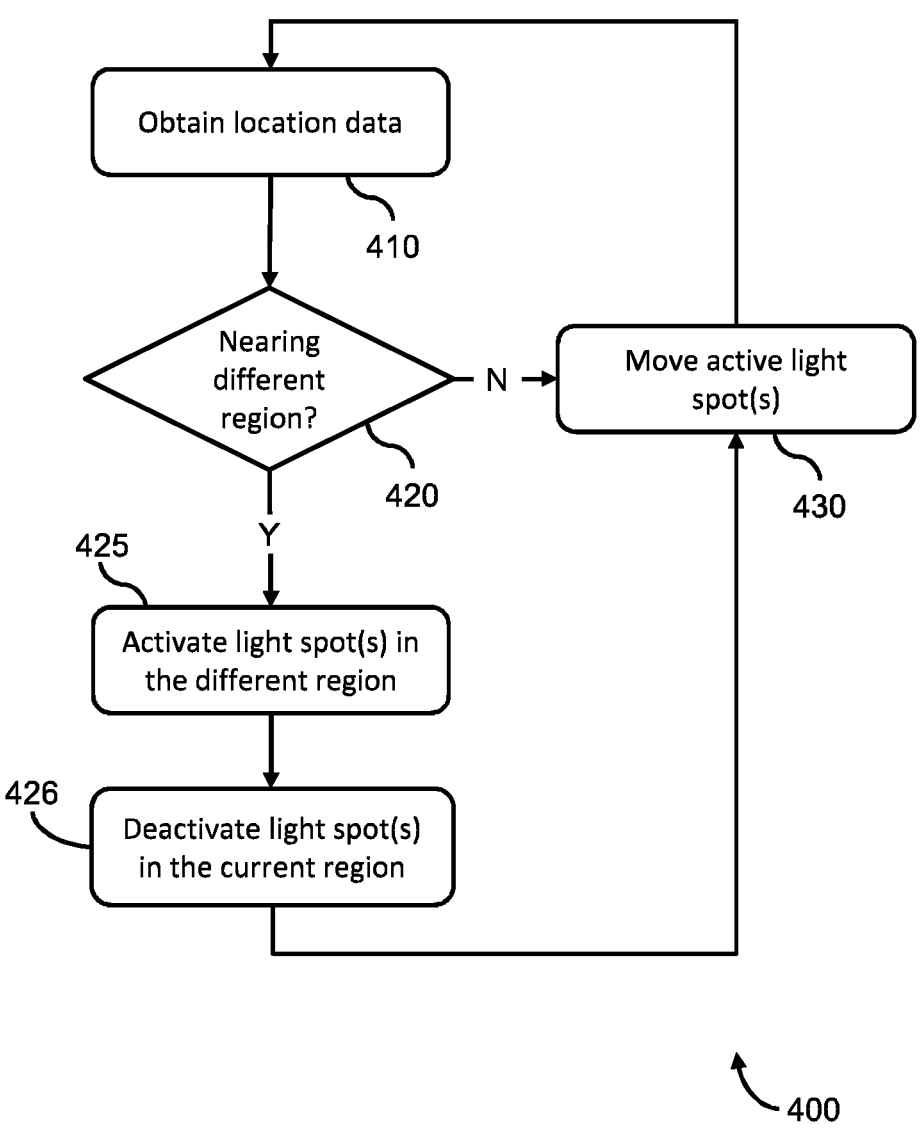
FIG. 4 illustrates a third control method.

FIG. 4 illustrates a third control method 400 for controlling one or more characteristics of the light beam(s) according to an embodiment. The control method may be employed by the control system 120 of FIG. 1.

For the third control method, the light emitting arrangement is configured to emit a plurality of light beams (e.g., using a plurality of light emitting elements). Each light beam creates a light spot in different regions or areas of a coop. Such a light emitting arrangement facilitates control of the movement of the poultry over a larger area than possible using a single light beam.

The control method 400 comprises a step 410 of obtaining location data of the poultry. The location data is usable to determine at least in which region the poultry is/are located.

The control method 400 also comprises a step 420 of controlling which light beam(s) and/or light spot(s) are active responsive to the obtained location data.

By way of example, step 420 may determine when the poultry is/are approaching a different region with respect to a current region in which the poultry is/are located. In response to determining that the poultry are approaching a different region, the method may perform a step 425 of activating the light emitting element(s) for providing a light spot (or light spots) in that different region, and a step 426 of deactivating the light emitting element(s) for providing a light spot (or light spots) in the current region.

This provides a mechanism for manipulating the movement of the poultry, e.g., performing crowd control of the poultry.

The proposed method can, for instance, be used to stimulate or manipulate a movement of the poultry towards a desired location. It is anticipated that a method that makes use of light spot (i.e., produced using a light beam with a narrow beam divergence) would have a greater effect that merely changing the light settings at that target location (such as e.g., highlighting the target location).

Method 400 may therefore comprise a step 430 of controlling the position of the active or current light spot(s) to encourage movement towards a desired or target location. For example, one might want to use the light spot(s) to trigger a group of birds to come to an area where feed or water is easily available and where the space is not yet occupied with other birds.

However, this is not essential, and any movement of the active light spot(s) may be independent of a target/desired location. For instance, if moving, the movement or movement pattern of an active light spot(s) may be pseudo-random to trigger or stimulate movement of the poultry.

It will be appreciated that a combination of the previously described control methods can be employed, e.g., the control methods can be employed at a same time. For instance, different control methods may be responsible for different characteristics of the light beam(s) and/or light spot(s). As another example, different control methods may be used to define upper or lower bounds for characteristics controlled by other control methods.

As an example, the control method 300 may be used to define an upper and/or lower bound for one or more particular characteristics (e.g., movement speed) based on the age of the poultry. The control method 200 may then be used to define the same characteristic(s) based on a current movement of the poultry. Other suitable variations will be apparent to the skilled person.

Additional control methods or schemes can also be used in addition and/or co-operation with previously described embodiments.

As one example, the control system may be configured to modify one or more characteristics responsive to a schedule. For instance, it has previously been described how the control system can be configured to switch between at least a first and second set of one or more characteristics. In some examples, the control system may perform a switch between different sets of characteristics responsive to a schedule (e.g., every hour or the like). Switching characteristics responsive to a schedule can overcome a habituation effect in poultry, e.g., to avoid the poultry becoming accustomed or used to the light beam(s)/spot(s). This approach can thereby maintain a high level of movement in the poultry.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa. Any reference signs in the claims should not be construed as limiting the scope.

The invention claimed is:

1. A lighting system for poultry, the lighting system comprising:

a light emitting arrangement configured to project one or more light beams, each light beam creating a light spot on a surface in proximity to the poultry and having a beam divergence of less than 15°;

a movement sensor configured to monitor movement of the poultry; and a control system communicatively coupled to the light emitting arrangement and configured to control one or more characteristics of the one or more light beams, wherein the control system is configured to:

measure an amount of movement of the poultry based on data from the movement sensor; and control the one or more characteristics of the one or more light beams responsive to the measured amount of movement of the poultry being at least one of above or below a predetermined measure.

2. The lighting system of claim 1, wherein the one or more characteristics of the one or more light beams includes a speed of movement or a pulse speed of the one or more light beams.

3. The lighting system of claim 1, wherein the one or more characteristics of the one or more light beams includes a number, a color, a color temperature, a size, an intensity and/or a shape of the one or more light beams or any light spot created from the one or more light beams.

4. The lighting system of claim 1, wherein the one or more light beams comprises a plurality of light beams that create a plurality of light spots.

5. The lighting system of claim 1, wherein the control system is configured to controllably switch the one or more characteristics between at least:

a first set of one or more characteristics; and a second set of one or more characteristics.

6. The lighting system of claim 5, wherein the control system switches between the first and second set of one or more characteristics responsive to a schedule.

7. The lighting system of claim 5, wherein the control system switches between the first and second set of one or more characteristics responsive to the measured amount of movement of the poultry.

8. The lighting system of claim 1, wherein the measured amount of movement comprises measurement data indicative of one or more of a speed of movement of the poultry, an amount of wing flapping performed by the poultry, a number of poultry moving, a response time of poultry to a trigger, or a trajectory length of a movement by the poultry.

9. The lighting system of claim 1, wherein the light emitting arrangement is configured to move the one or more light beams according to a pseudorandom pattern.

10. The lighting system of claim 1, wherein the control system is further configured to obtain one or more identifying properties of the poultry, the one or more identifying properties comprising at least one of a type of the poultry, a breed of the poultry, a scientific classification of the poultry, a life stage of the poultry or an age of the poultry.

11. The lighting system of claim 1, wherein the light emitting arrangement comprises a plurality of light emitting elements, each configured to emit one or more light beams.

12. A poultry coop comprising:

the lighting system of claim 1; and a poultry enclosure configured to enclose poultry, wherein the one or more light beams projected by the light emitting arrangement of the lighting system create one or more light spots within the poultry enclosure.

13. The lighting system of claim 1, wherein the one or more characteristics are selected based on the measured amount of movement of the poultry to produce a response in the poultry.

14. The lighting system of claim 13, wherein the response is a movement of the poultry.

15. The lighting system of claim 1, wherein the one or more light beams comprise one or more laser beams.

16. The lighting system of claim 1, wherein the predetermined measure comprises a first predetermined measure, and the control system is further configured to:

determine whether the measured amount of movement of the poultry is below the first predetermined measure or is above a second predetermined measure; and control the one or more characteristics of the one or more light beams when the measured amount of movement of the poultry is below the first predetermined measure or above the second predetermined measure.

17. The lighting system of claim 1, wherein the control system is further configured to generate a user-perceptible output of an outcome of determining whether the measured amount of movement of the poultry is at least one of above or below the predetermined measure.

18. The lighting system of claim 1, wherein the one or more characteristics of the one or more light beams comprises a pulse speed of the one or more light beams.

19. The lighting system of claim 1, wherein the control system is further configured to receive one or more identifying properties of the poultry from a user input device.

20. The lighting system of claim 1, wherein the control system is further configured to:

receive video data from the movement sensor; and process the video data to measure the amount of movement of the poultry.

* * * * *